A. Ward.
Tailoring.
N⁰ 415.   Patented Sept. 28. 1837.
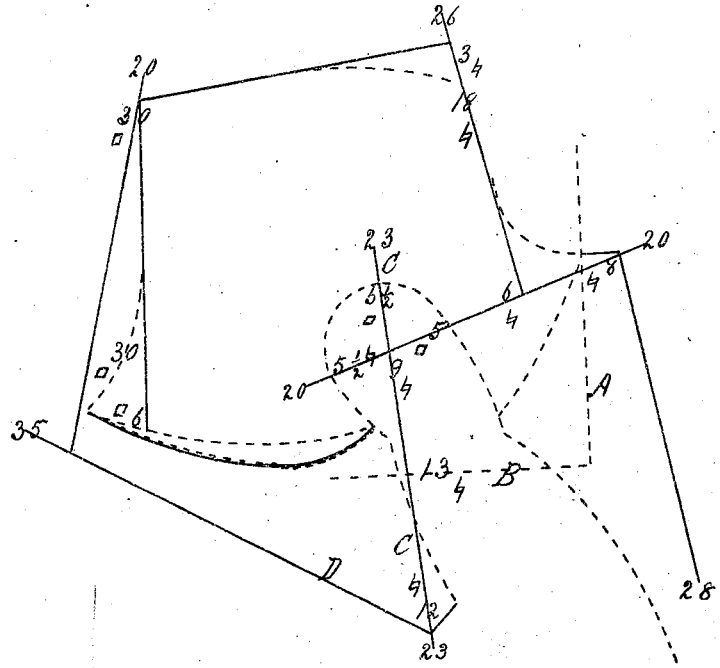
A. F. Ward
S. A. Ward
Allen Ward

UNITED STATES PATENT OFFICE.

ALLEN WARD, OF MOYAMENSING, PENNSYLVANIA.

METHOD OF DRAFTING OUT THE FORE PARTS OF COATS.

Specification of Letters Patent No. 415, dated September 28, 1837.

*To all whom it may concern:*

Be it known that I, ALLEN WARD, of Moyamensing, in the county of Philadelphia and State of Pennsylvania, have invented a new and Improved Method of Drafting Out the Fore Parts of Coats; and I do hereby declare that the following is a full and exact description of my invention, the nature of which consists in a shorter and better method of sketching the forms of coats to fit the human shape and to teach the art of cutting by.

To enable others who are or may become skilled in the art of drafting out coats by means of protractor and scales to use my invention I will describe it as follows: I first cut out the back of a coat as fashion or fancy may require. I then make a dot on the near edge of a piece of cloth at a convenient distance from the top or bottom say about thirteen numbers of Ward's division of breast scale from the top from which I run an angle by Ward's protractor of twenty three degrees fore and aft, the aft end of the angle will of course extend upon the cutting board. I apply the breast scale and measure twelve portions aft of the dot and there make a mark on the line or angle from which mark I draw a line by thirty five degrees to which line I place the back seam with the top at the mark and while the back lies in this the closing position I mark for the top and bottom of the side seam and also opposite to the blade bones and at the bottom of the back seam by the back. I then run an angle from the bottom of the back seam to front by twenty degrees and measure out on it thirty of the waist scale. I then measure from the bottom of the side-seam six numbers up with the waist scale and draw a scribe line from thence to said thirty. I then take a sweep of thirty from the bottom of sideseam to a junction with the said scribe line. I then form the sideseams of the foreparts about three fourths of an inch more full than those of the backs. I then measure nine portions of the breast scale on the angle twenty three from the edge of the cloth, from this point I draw a line by an angle of twenty degrees right and left. I then take the waist scale and measure upward on the last mentioned angle five portions, from thence six portions of breast scale and make a dot, continue eight portions more breast scale then run an angle of twenty six degrees from the dot at six, and on the angle measure out eighteen portions breast measure for the width of the breast, I continue three numbers from the eighteen, and from thence to the bottom of the breast at thirty I draw a scribe line and round the breast from the eighteen to a junction with the scribe line. I then run an angle of twenty eight degrees from the dot at eight and apply the back seam to it with the top at eight and while the shoulder seam is thus lying in the closing position I form the neck gorge and scye also the shoulder seams of the foreparts by those of the back I then measure from the dot at nine to the front of scye five and a half numbers with the waist scale and from the dot at nine to the bottom of scye I measure five and a half with the breast scale and then form the scye according to the dots and thus complete the draft of the fore parts of a coat adapted to every variation of shape of backs, for upon this principle the shape of back has nothing to do with the fit, which is one of the great advantages of this mode of drafting.

What I claim as my new invention and desire to have secured by Letters Patent is—

The method herein described of drafting out the foreparts of coats for the purpose of expediting the work and insuring the fit. The following drafts or diagrams of a coat will show the practical tailor at a glance how to produce the balancing points of coats according to my new method and with about one half the labor usually bestowed for that purpose.

ALLEN WARD.

Witnesses:
JNO. HANSE,
M. L. LONGHEAD,
S. A. WARD.